Nov. 29, 1938.  T. U. ANGELL  2,138,130
CAR STRUCTURE
Filed Oct. 23, 1937  3 Sheets-Sheet 1
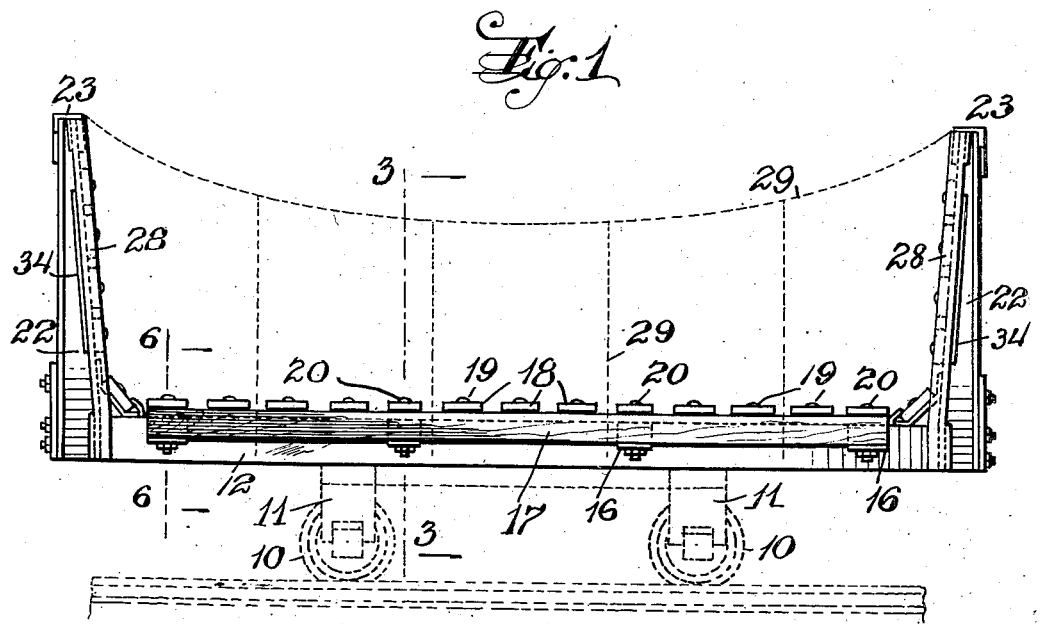
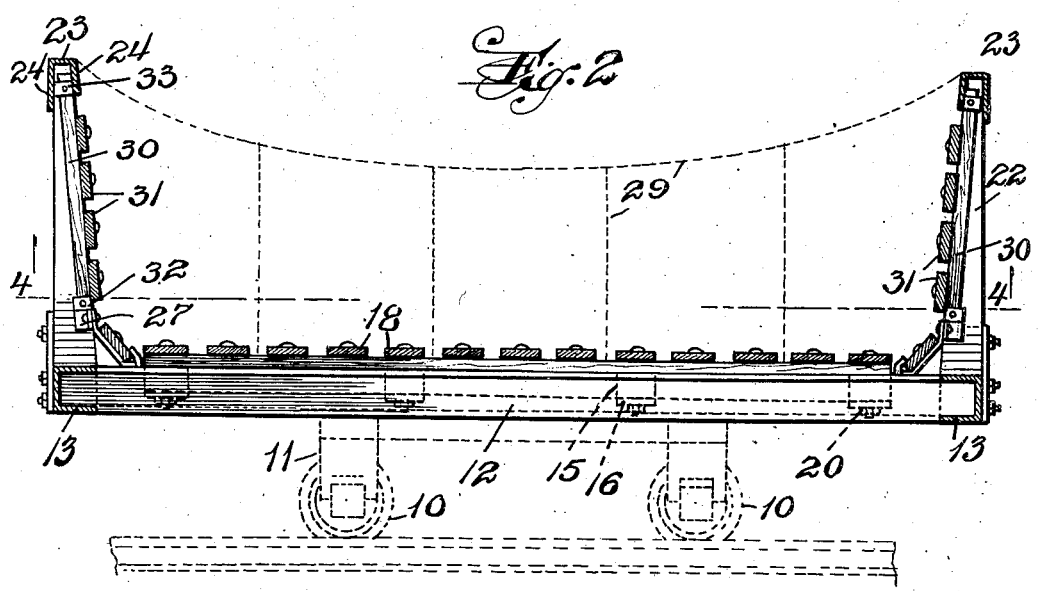
INVENTOR
Thomas U. Angell,
BY
ATTORNEY.

Nov. 29, 1938. T. U. ANGELL 2,138,130
CAR STRUCTURE
Filed Oct. 23, 1937 3 Sheets-Sheet 2
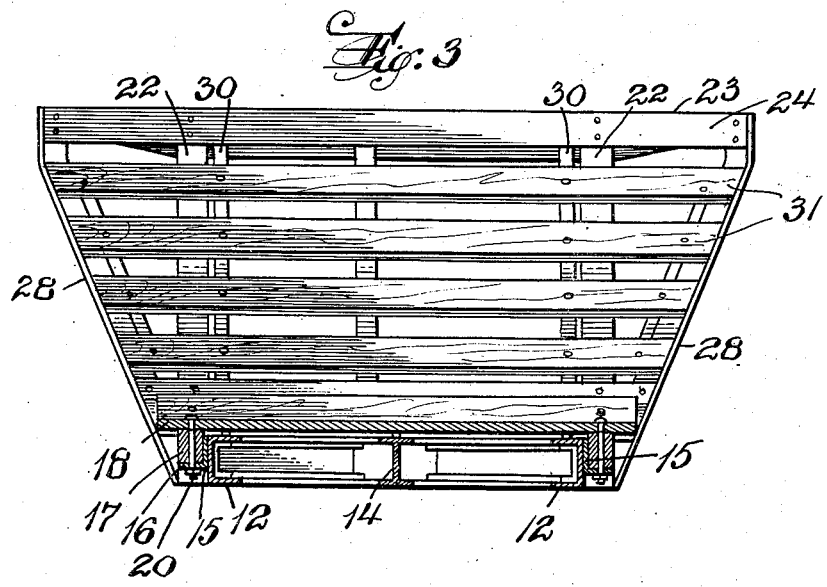
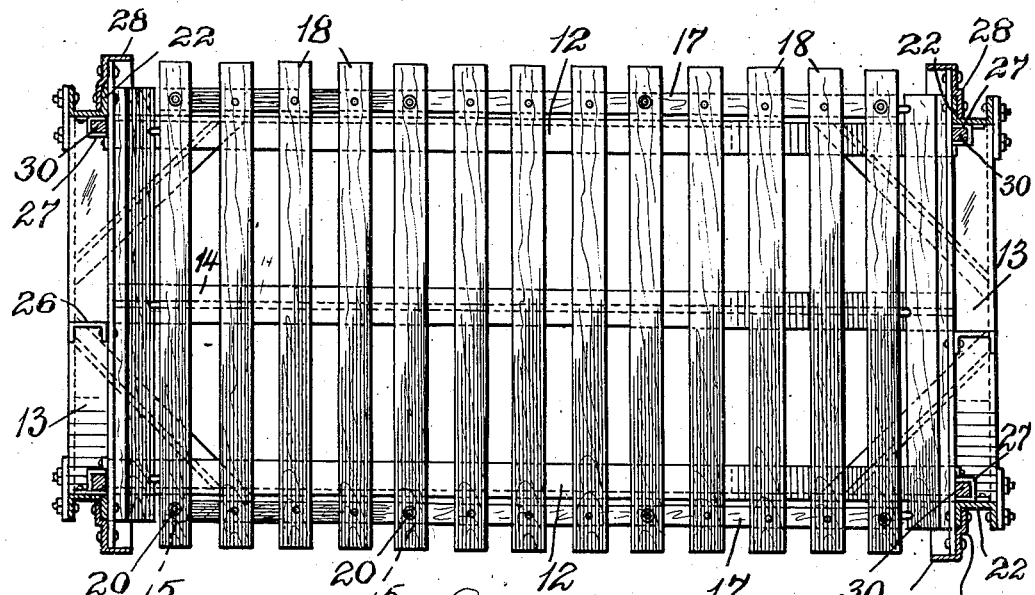

Nov. 29, 1938.　　T. U. ANGELL　　2,138,130
CAR STRUCTURE
Filed Oct. 23, 1937　　3 Sheets-Sheet 3
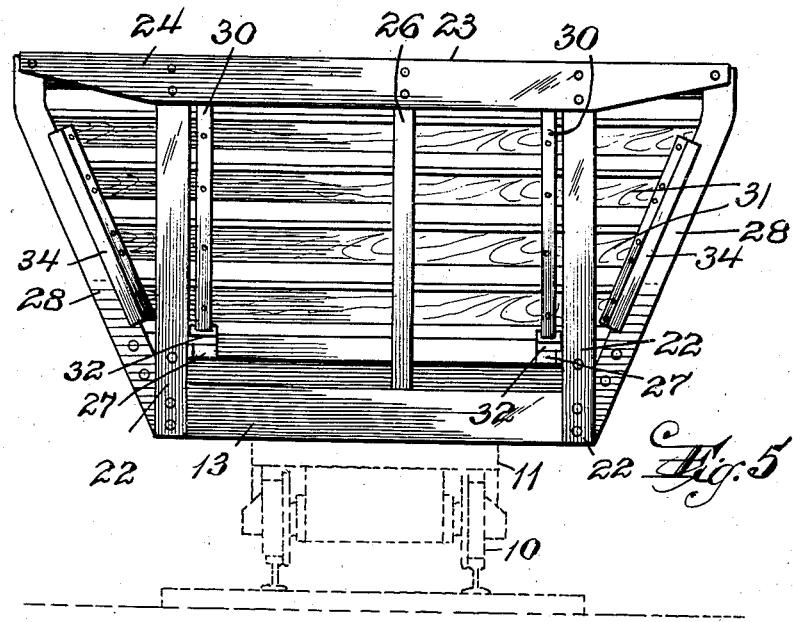
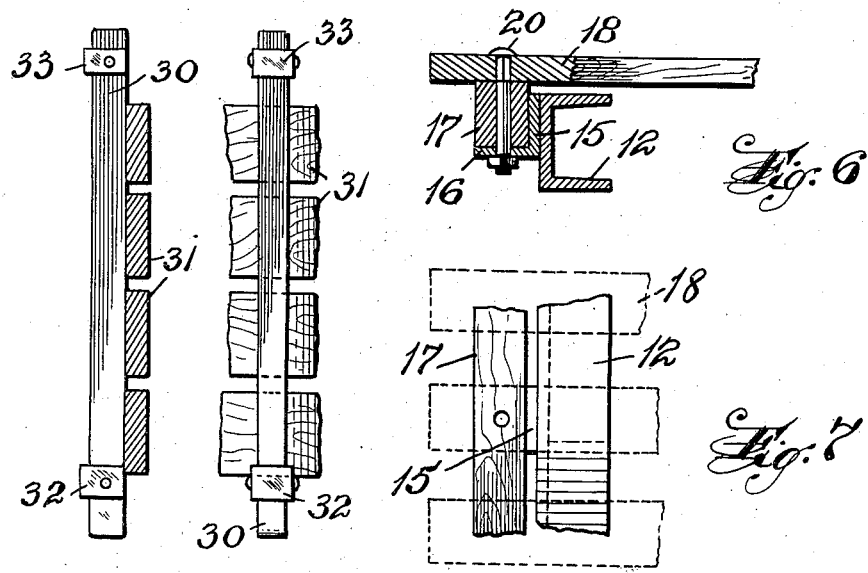
INVENTOR:
Thomas U. Angell,
BY
Wm. H. Caufield,
ATTORNEY.

Patented Nov. 29, 1938

2,138,130

UNITED STATES PATENT OFFICE 2,138,130

CAR STRUCTURE

Thomas U. Angell, Honolulu, Territory of Hawaii, assignor to The Gregg Company, Ltd., New York, N. Y., a corporation of New York Application October 23, 1937, Serial No. 170,552

6 Claims. (Cl. 105—367)

This invention relates to an improved car structure which car is of the light type with a floor and end walls, in which type the repair and maintainance of the car requires easy and relatively quick access to the various parts of the car.

The car is particularly designed for use in transporting and for quick loading and unloading of its load and by reason of which frequent loading and unloading the various parts are subjected to damage. The car is such as are used in handling damp or wet loads and is particularly designed for use in handling sugar cane and material of like nature. The cars are used mainly in tropical countries and in addition to moisture from the loads there is constant deterioration due to tropical climates.

In such use the cars require frequent replacement of parts due to the rust and also more frequent painting of the metal parts than is necessary in drier or more temporate climates. The rotting of the wooden parts where they contact the metal parts is a large factor in the necessity of repair and replacement. This factor also makes it necessary to paint the metal parts where such rotting takes place.

The object of the present invention is to provide a car with a floor and end walls which are made mainly of wood and which are readily removable for inspection and repair and for access to the metal parts for re-painting.

Another object of the invention is to provide such car as outlined above in which the parts, when assembled, have a minimum of contact between the metal parts of the car and the wooden parts of the car. The floor is low on this kind of car and the brakes and running gear are made accessible from above by removal of the floor and this lends added advantage to the car made according to this invention, in which the floor can be released and lifted bodily from the car-frame.

The invention is illustrated in the accompanying drawings. In said drawings, Figure 1 is a side view of a car embodying my invention with the running gear shown in dotted outline. Figure 2 is a longitudinal section of the car shown in Figure 1. Figure 3 is a section taken on line 3—3 in Figure 1. Figure 4 is a section taken on line 4—4 in Figure 2. Figure 5 is an end view of the car. Figure 6 is a detail section taken on line 6—6 in Figure 1. Figure 7 is a top view of the parts shown in Figure 6. Figure 8 is a detail section of part of the end wall of the car, and Figure 9 is a front view of the parts shown in Figure 8.

The running gear and brakes are not fully shown but indicated by dotted lines, the wheels 10 and 11 being deemed sufficient for purpose of illustration.

The frame of the car is rectangular comprising the side members 12 and the end sills 13, these side members and end sills being usually channel-shaped, the flanges of the sills extending over the ends of the side members, the car-frame being further strengthened by a central member 14, the whole being securely bolted or welded together and so far as described is a usual form of frame and devoid of novelty.

On the side frames 12 are secured clips, the illustration showing them on the outer face of the side members. The clips 15 are spaced apart, there being usually four on each side and they are bolted or welded on the side of the frames and have the projecting lips 16.

The floor of the car comprises the stringers 17 and the floor boards 18. The stringers are arranged on the outside of the side members 12 and rest on the clips 15. They are of a dimension to insure the top faces of the stringers being above the side members 12 of the frame. The floor boards 18 are nailed to the stringers as shown at 19 except those boards resting above the clips. These boards, the stringers and the clips, are fastened together by carriage bolts 20 or similar fastening devices. It will be evident that the floor boards do not contact with or rest on the metal frame of the car and the stringers 17 only contact the metal at the clips 15 as the clips space the stringers from the sides of said frames. The rust and rotting is therefore confined to these contact places and when paint is to be applied to the frame or the floor raised for brake adjustment or repair or for lubrication, all that is required is to unscrew the bolts 20 and lift the assembled floor from the frame. The air-space between the stringers and the side members insures a minimum of rust and decay which results in the old form of car with these metal and wooden parts in contact.

The ends of the car are also provided with removable parts in the form of end walls made of wood and readily inserted or removed from the end construction. The ends of the frame are provided with standards 22, two in each, and at the corners, and capped by a top piece 23 which is channel-shaped or U-shaped and secured in inverted position on the top of the standards, the flanges 24 of the top piece extending downwardly, the outer one being deeper than the inner one, the top-piece being secured to the standards by welding or rivets. A central standard 26 is usually placed to add stability to the end structure.

At the base of each standard 22 is a socket 27, welded or riveted into place, such socket being used to receive uprights of the end wall as will be hereinafter evident. At each side of the end standards are inclined braces 28 secured at the top to the ends of the top pieces 23 and at the bottom to the frame of the car. This oblique arrangement of the braces 18 provides a wider top to the ends of the car which is desirable in cars of this kind which transport such material as sugar cane. The load is further confined by chains 29 and hooked at the ends to the end structure to allow ready release of the load from the sides of the car. This chain feature is accepted practice in cars for transporting sugar cane.

The end wall is composed of uprights 30 and horizontal boards 31 nailed to the uprights 30. The uprights 30 are spaced to fit into the sockets 27. The uprights 30 are provided with bands, the lower ones 32 being spaced from the bottom of the uprights and act as stops for supporting the uprights in the sockets 27. The upper bands 33 are near the top of the uprights and both the upper and lower bands 32 and 33 serve to insure a space between the metal standards 22 and wooden uprights 30. The uprights 30 are shorter than the distance between the top of the top piece 23 and the top of the socket 27.

The end wall is provided at each side with inclined flanges 34. The braces 28 are of angle iron and thus provide flanges over which the flanges 34 can be hooked, as in Figure 5.

When the end wall is to be removed it is lifted, as the clearance at the top between the top-piece 23 and ends of the uprights allows this. When the uprights 30 clear the sockets 27 the flanges 34 are clear of the braces 28 and the bottom of the end wall is swung inwardly to clear the sockets 27 and then the wall is lowered to allow the tops of the uprights 30 to emerge from under the top piece 23 and then the end wall is free for removal. In installing the end wall, the uprights are placed in the channel in the top piece 23, and raised to permit the uprights to be seated in the sockets 27, then the end wall is dropped. This lowering of the end wall seats the uprights in the sockets, limited by the bands or collars 32 and the flanges 34 ride down over the braces 28.

The construction of the frame for supporting the end wall allows for vertical upward movement into sockets before removal of the end wall and while the U-shaped piece 23 offers a ready means for this, it will be understood that equivalent socket means can be employed as this retaining device.

This ready removal made possible by this instruction permits economical and frequent inspection, painting and repair of cars especially those used in transporting moist or wet loads and in climates where excessive humidity makes such repairs and inspection necessary.

I claim:

1. A car structure comprising a horizontal frame, standards extending from the frame, a U-shaped top-piece secured in inverted position on the top of the standards, a pair of braces secured at the bottom to the outer sides of the standards and inclined outwardly with their top ends secured to the top-piece, sockets secured to the standards, a removable end-frame comprising uprights fitting in the sockets at their lower ends and with their top ends inside the top-piece but terminating short of the top thereof to allow vertical removal of the lower ends from the sockets, and boards secured to said uprights and forming an end wall for the car.

2. A car structure comprising a horizontal frame, standards extending from the frame, a U-shaped top-piece secured in inverted position on the top of the standards, a pair of braces secured at the bottom to the outer sides of the standards and inclined outwardly with their top ends secured to the top-piece, sockets secured to the standards, a removable end-frame comprising uprights fitting in the sockets at their lower ends and with their top ends inside the top-piece but terminating short of the top thereof to allow vertical removal of the lower ends from the sockets and inclined flanges secured to said end frame and arranged to be seated over the inclined braces when the uprights are seated in the sockets.

3. A car structure comprising a horizontal frame, standards secured to said frame at one end thereof, an inverted channel-shaped top-piece on the standards, sockets secured to the bottom of the standards, an end wall comprising uprights, bands on the uprights near the upper and lower ends thereof, the lower bands to limit the descent of the standards in the sockets, the parts being proportioned to allow vertical movement of the end wall structure to an extent to allow the lower ends of the uprights to clear lower sockets for the removal of the end wall, the upper bands spacing the end wall from the standards, and boards secured to the uprights.

4. A car structure comprising a horizontal frame, standards secured to said frame at one end thereof, an inverted channel-shaped top-piece on the standards, sockets secured to the bottom of the standards, an end wall comprising uprights, bands on the uprights, the lower ones to limit the descent of the standards in the sockets, boards secured to the uprights, inclined braces secured at the bottom of the standards and extending outwardly and upwardly and secured to the top piece, and inclined flanges secured to the end wall and disposed so that they are seated over the braces when the uprights are lowered into the sockets, the upper ends of the uprights being supported in the top-piece and short enough to allow upward vertical movement sufficient to allow withdrawal of the uprights from the sockets.

5. In a car structure, an end structure comprising upwardly extending standards, a top-piece extending across and secured to the standards, sockets at the bottom of the structure, a removable end wall comprising uprights, boards secured to the uprights, the uprights fitting into the sockets, bands on the uprights to engage the sockets and limit the descent of the end wall, and means on the standards for slidably supporting the tops of the uprights whereby the end wall can be lifted to clear the sockets.

6. In a car structure, an end structure comprising upwardly extending standards, a top-piece extending across and secured to the standards, sockets at the bottom of the structure, a removable end wall comprising uprights, boards secured to the uprights, the uprights fitting into the sockets, bands on the uprights to engage the sockets and limit the descent of the end wall, means on the standards for slidably supporting the tops of the uprights whereby one end wall can be lifted to clear the sockets, braces secured to the bottom of the end structure and extending upwardly and outwardly and secured at their tops to the top-piece, and inclined flanges on the end wall to fit over the said braces when the end wall descends into place and to clear said braces when the uprights clear the sockets.

T. U. ANGELL.